United States Patent
Zhang et al.

(10) Patent No.: US 8,135,274 B2
(45) Date of Patent: *Mar. 13, 2012

(54) SYSTEM AND METHOD FOR FAULT IDENTIFICATION IN OPTICAL COMMUNICATION SYSTEMS

(75) Inventors: Hongbin Zhang, Marlboro, NJ (US); Lee Richardson, Eatontown, NJ (US)

(73) Assignee: Tyco Electronics Subsea Communications LLC, Morristown, NJ (US)

( * ) Notice: Subject to any disclaimer, the term of this patent is extended or adjusted under 35 U.S.C. 154(b) by 718 days.

This patent is subject to a terminal disclaimer.

(21) Appl. No.: 12/029,151

(22) Filed: Feb. 11, 2008

(65) Prior Publication Data

US 2009/0202237 A1 Aug. 13, 2009

(51) Int. Cl.
- *G02F 1/00* (2006.01)
- *G02F 2/00* (2006.01)
- *H01S 3/00* (2006.01)
- *H04B 10/00* (2006.01)
- *H04B 10/08* (2006.01)
- *H04B 17/00* (2006.01)
- *H04J 14/00* (2006.01)

(52) U.S. Cl. .................. 398/11; 398/6; 398/10; 398/13; 398/16; 398/17; 398/18; 398/20; 398/25; 398/30; 398/31; 398/32; 398/33

(58) Field of Classification Search .................. None
See application file for complete search history.

(56) References Cited

U.S. PATENT DOCUMENTS

| | | | | |
|---|---|---|---|---|
| 5,969,833 | A * | 10/1999 | Jensen | 398/34 |
| 7,809,279 | B2 * | 10/2010 | Zhang et al. | 398/177 |
| 2004/0037568 | A1 * | 2/2004 | Evangelides, Jr. | 398/159 |
| 2004/0161191 | A1 * | 8/2004 | Yokoyama et al. | 385/27 |
| 2007/0041006 | A1 * | 2/2007 | Abbott | 356/73.1 |
| 2009/0154919 | A1 * | 6/2009 | Desbruslais et al. | 398/11 |
| 2009/0324249 | A1 * | 12/2009 | Zhang | 398/177 |

FOREIGN PATENT DOCUMENTS

| | | |
|---|---|---|
| EP | 1758279 | 2/2007 |
| GB | 2273623 | 6/1994 |

OTHER PUBLICATIONS

Jensen, et al., "New Technology for Operating and Maintaining SL200 Systems," Suboptics, 1993, pp. 523-526.

Jensen, et al., "Novel Technique for monitoring long-haul undersea optical-amplifier systems," OFC '94, Paper ThR3 (1994) pp. 256-257.

Cornwell, "In-Service Line Performance Monitoring with COTDR," Poster We 15.2, article, undated. (3 pages).

European Search Report dated Jun. 22, 2009 issued in related European Patent Application No. 09150879.6-2415.

* cited by examiner

*Primary Examiner* — Kenneth N Vanderpuye
*Assistant Examiner* — Darren E Wolf
(74) *Attorney, Agent, or Firm* — Grossman, Tucker, Perreault & Pfleger, PLLC

(57) ABSTRACT

A system and method for fault identification in optical communication networks. One or more repeaters in the system includes a loop back path that couples an output a first amplifier for amplifying signals carried in a first direction through a repeater to an input of a second amplifier for amplifying signals carried in a second direction through said repeater. Fault analysis is conducted using loop gain data associated with test signals transmitted on the first or second paths and returned on the opposite path through the loop back paths.

12 Claims, 3 Drawing Sheets

SYSTEM AND METHOD FOR FAULT IDENTIFICATION IN OPTICAL COMMUNICATION SYSTEMS

TECHNICAL FIELD

The present application relates to communication systems and, more particularly, to a system and method for fault identification in optical communication systems.

BACKGROUND

In long distance optical communication systems it may be important to monitor the health of the system. For example, monitoring can be used to detect faults or breaks in the optical transmission cable, faulty repeaters or amplifiers or other problems with the system.

Known monitoring techniques include use of line monitoring equipment (LME) that generates one or more LME test signals representing a pseudo random bit sequence. The LME may transmit the test signals with the information signals, e.g. in wavelength division multiplexed (WDM) system. The test signals may be returned to the line monitoring equipment through a high-loss loop back (HLLB) path within an amplifier or repeater. The LME may then separate the returned test signals from the data signals, and process the returned test signals to obtain data representing the HLLB loop gain imparted to the test signals in their propagation from the LME, through the HLLB and any intervening optical paths and amplifiers, and back to the LME. Significant deviations in HLLB loop gain may indicate a fault in the system.

In an undersea optical communication system, repeater pump power loss and increased fiber span loss may be primary failure mechanisms resulting in HLLB loop gain deviations from normal values. In a known system, significant variations in HLLB loop gain, e.g. above a predefined alarm threshold, may trigger a system alarm. Choice of the alarm threshold in such a system may require discrimination between normal system fluctuations and measurement errors and real transmission path faults. Unfortunately, this discrimination may be difficult since HLLB loop gain measurements may be generally insensitive to physical changes in the transmission path due, in part, to the repeater loop back output-to-output architecture, as well as gain mechanisms in the repeater amplifier, e.g. self-gain regulation Consequently, real path changes for non-devastating failures in such systems may result in HLLB loop gain changes that are only slightly detectable given typical measurement errors and system fluctuations.

BRIEF DESCRIPTION OF THE DRAWINGS

Reference should be made to the following detailed description which should be read in conjunction with the following figures, wherein like numerals represent like parts.

DETAILED DESCRIPTION

Figure 1:
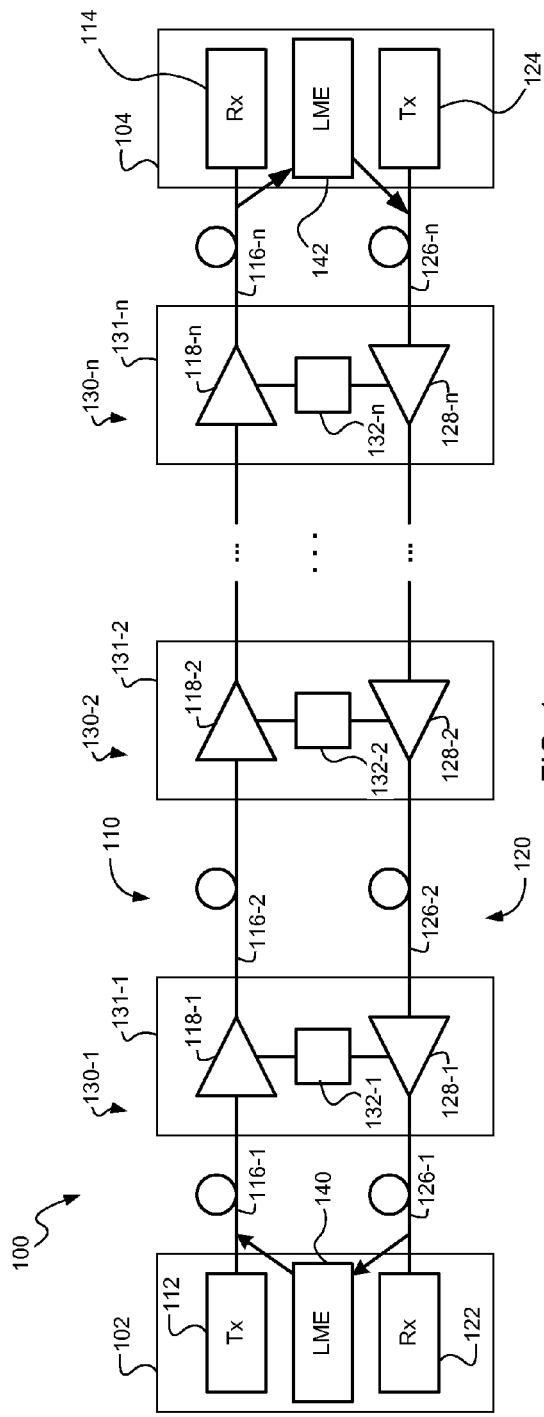
FIG. 1 is a simplified block diagram of one exemplary embodiment of a system consistent with the present disclosure.

FIG. 1 is a simplified block diagram of one exemplary embodiment of WDM transmission system 100 consistent with the present disclosure. In general, the system 100 may be configured to calculate a loop gain value associated with each repeater/amplifier. Variation in the loop gain may be used to generate a system alarm indicating a fault in the system.

Those of ordinary skill in the art will recognize that the system 100 has been depicted as a highly simplified point-to-point system form for ease of explanation. It is to be understood that a system and method consistent with the present disclosure may be incorporated into a wide variety of network components and configurations. The illustrated exemplary embodiments herein are provided only by way of explanation, not of limitation.

As shown, system 100 may include terminals 102, 104 coupled by two unidirectional optical paths 110, 120, which together form a bi-directional optical path pair. The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals.

Optical path 110 may carry optical data on a plurality of channels (or wavelengths) in one direction from a transmitter 112 in the terminal 102 to a receiver 114 in the terminal 104. Optical path 120 may carry optical data on a plurality of channels (or wavelengths) in a direction opposite from the direction associated with path 110 from a transmitter 124 in the terminal 104 to a receiver 122 in the terminal 102. With respect to terminal 102, the optical path 110 is an outbound path and the optical path 120 is an inbound path. With respect to terminal 104, the optical path 120 is an outbound path and the optical path 110 is an inbound path. The optical path 110 may include an alternating concatenation of optical fibers 116-1 to 116-$n$ and optical amplifiers 118-1 to 118-$n$, and the optical path 120 may include an alternating concatenation of optical fibers 126-1 to 126-$n$ and optical amplifiers 128-1 to 128-$n$.

The optical path pair (e.g., optical paths 110, 120) may include sets of amplifier pairs 118-1 to 118-$n$ and 128-1 to 128-$n$ disposed within housings 131-1 to 131-$n$ of associated repeaters 130-1 to 130-$n$ and connected by pairs of optical fibers 116-1 to 116-$n$ and 126-1 to 126-$n$. The pairs of optical fibers 116-1 to 116-$n$ and 126-1 to 126-$n$ may be included in an optical fiber cable together with fibers supporting additional path pairs. Each repeater 130 may include a pair of amplifiers 118, 128 for each supported path pair. Optical amplifiers 118, 128 are illustrated in simplified form may include one or more erbium doped fiber amplifiers (EDFAs) or other rare earth doped fiber amplifiers, Raman amplifiers or semiconductor optical amplifiers. A coupling path 132-1 to 132-$n$ may be coupled between optical paths 110, 120, for example, in one or more of the housings 131-1 to 131-$n$ of the repeaters 130-1 to 130-$n$, and may include, for example, one or more passive optical coupling components, as will be described in greater detail below.

Line monitoring equipment (LME) 140, 142 may be located in one or both of the terminals 102, 104 to provide passive line HLLB monitoring for the path pair 110, 120. The LME 140, 142 may perform known signal generation, signal detection and processing functions and may include known transmitters, receivers, and processors configured to perform those functions. Monitoring equipment 140 may launch one or more LME test signals, e.g. at different wavelengths, into one optical path 110 (e.g., an outbound optical path). Coupling paths 132-1 to 132-n may couple a sample of the LME test signals propagating in optical path 110 into the forward propagating direction of the other optical path 120 (e.g., an inbound optical path). Monitoring equipment 140 may then receive and measure the samples to detect changes in loop gain as an indication of a fault in the system. Monitoring equipment 142 may launch one or more LME test signals, e.g. at different wavelengths, into one optical path 120 (e.g., an outbound optical path). Coupling paths 132-1 to 132-n may couple a sample of the LME test signals propagating in optical path 120 into the forward propagating direction of the other optical path 110 (e.g., an inbound optical path). Monitoring equipment 142 may then receive and measure the samples to detect changes in loop gain as an indication of a fault in the system.

Although the each of the pairs of amplifiers 118-1 to 118-n and 128-1 to 128-n is shown as having an associated coupling path 132-1 to 132-n, the coupling paths may be located in other locations (e.g., outside of the repeaters housing the amplifier pairs) and/or may not be located in every amplifier pair. According to an exemplary embodiment, the coupling paths 132-1 to 132-n may be symmetric in operation, i.e., the function that describes the percent of optical power at each wavelength transferred from path 110 to path 120 by a coupling path 132-1 is the same as the function that describes the percent of optical power at each wavelength transferred from path 120 to path 110 by the coupling path 132-1. Alternatively, one or more coupling paths may not be symmetric and different coupling paths may have different transfer functions.

Figure 2:
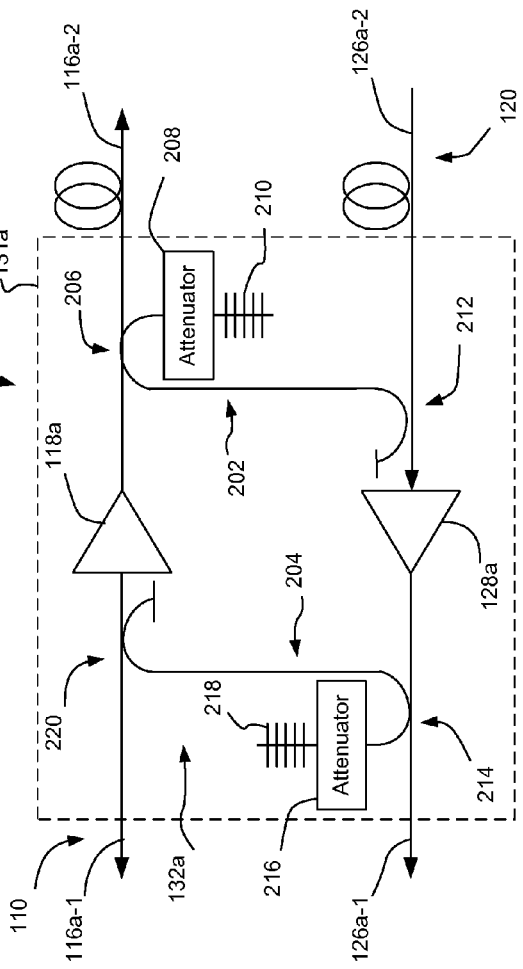
FIG. 2 simplified block diagram of one exemplary embodiment of a high loss loop back path configuration consistent with the present disclosure.

FIG. 2 illustrates one exemplary embodiment of a HLLB path configuration 132a consistent with the present disclosure. In the illustrated exemplary embodiment, an amplifier pair 118a, 128a is provided within the housing 131a of a repeater 130a. A first HLLB path 202 is provided for coupling an LME test signal generated by LME 140, from the path 110 to path 120. A second HLLB path 204 is provided for coupling an LME test signal generated by LME 142 from path 120 to path 110. The first HLLB path 202 includes an optical coupler 206, e.g. a 1% or 10% coupler that couples a small percentage of the total optical power of the signal at the output of amplifier 118a onto the path 202. The signal coupled onto the first HLLB path 202 by the coupler 206 is passed through an attenuator 208, e.g. a known 6 dB attenuator, to a wavelength selective filter 210 that reflects only the wavelengths of the LME test signals from LME 140. The filter 210 may take any of a variety of known filter configurations, e.g. a fiber Bragg grating. The wavelengths not reflected by the filter 210 may be provided to a high-return-loss termination. The LME wavelengths reflected by the filter 210 are passed through the attenuator 208 a second time and are coupled to the input of amplifier 128a by an optical coupler 212 that injects a portion (e.g., about 1% or 10% of the total optical power) thereof into the optical path 120 through which they are returned to the LME 140 as a returned LME signal.

The second HLLB path 204 includes an optical coupler 214, e.g. a 1% or 10% coupler that couples a small percentage of the total optical power of the signal at the output of amplifier 128a onto the path 204. The signal coupled onto the second HLLB path 204 by the coupler 214 is passed through an attenuator 216, e.g. a known 6 dB attenuator, to a wavelength selective filter 218 that reflects only the wavelengths of the LME test signals from LME 142. The filter 218 may take any of a variety of known filter configurations, e.g. a fiber Bragg grating. The wavelengths not reflected by the filter 218 may be provided to a high-return-loss termination. The LME wavelengths reflected by the filter 218 are passed through the attenuator 216 a second time and are coupled to the input of amplifier 118a by an optical coupler 220 that injects a portion (e.g., about 1% or 10% of the total optical power) thereof into the optical path 110 through which they are returned to the LME 142 as a returned LME signal.

Figure 3:
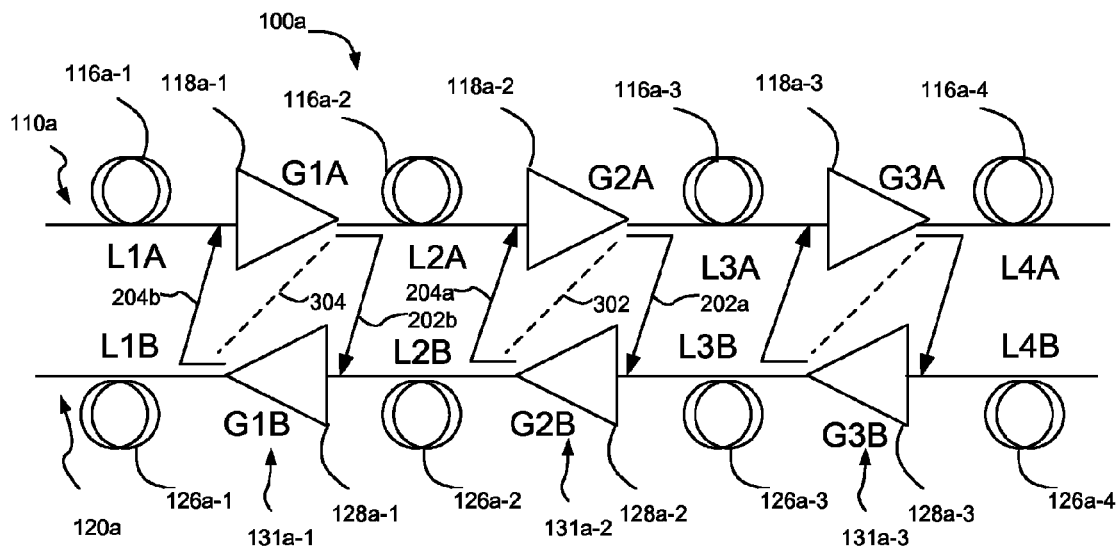
FIG. 3 diagrammatically illustrates gain associated with various segments of a system consistent with the present disclosure.

FIG. 3 diagrammatically illustrates gain associated with various segments of a system 100a consistent with the present disclosure including repeaters 131a-1, 131a-2 and 131a-3 having associated amplifier pairs 118a-1, 118a-2 and 118a-3 and 128a-1, 128a-2 and 128a-3 and loop back paths. In the illustrated exemplary embodiment, G1A, G2A and G3A represent the gain imparted by the amplifiers 118a-1, 118a-2 and 118a-3, respectively, and G1B, G2B and G3B represent the gain imparted by the amplifiers 128a-1, 128a-2 and 128a-3, respectively. Also, L1A, L2A, L3A and L4A represent the loss (negative gain) associated with the fiber segments 116a-1, 116a-2, 116a-3 and 116a-4, respectively, L1B, L2B, L3B and L4B represent the loss associated with fiber segments 126a-1, 126a-2, 126a-3 and 126a-4, respectively.

The HLLB paths illustrated in solid lines and extending between paths 110a and 120a diagrammatically represent HLLB paths consistent with the present disclosure. For example, path 202a represents a HLLB path consistent with the present disclosure for coupling of LME test signals from path 110a back to path 120a, and path 204a represents a HLLB path consistent with the present disclosure for coupling signals from path 120a to path 110a. The HLLB paths, e.g. paths 202a and 204a, are illustrated in highly simplified form, and may be configured, for example, as illustrated in FIG. 2.

The paths illustrated in dashed lines, e.g. path 302, and extending between paths 110a and 120a diagrammatically represent an alternative HLLB configuration for coupling LME test signals from path 110a back to path 120a. These paths are also shown in highly simplified form, and may include associated couplers, attenuators and filters for coupling LME test signals from an output of an amplifier on path 110a to an output of an amplifier 120a within a repeater housing.

The loop gain data associated with each repeater 131a may be calculated by comparing the returned LME test signal received through the repeater with a copy of the transmitted LME test signal. The loop gain for any repeater may represent the gain and the loss imparted to the test signal from the LME to through the loop back path associated with the repeater and back to the LME.

Differential loop gain calculations may be used to obtain increased sensitivity to faults in the system. The differential loop gain for each repeater 131a-n may be calculated as the loop gain associated with repeater 131a-n, minus the loop gain associated with previous repeater 131a-(n−1). For example, the differential loop gain associated with repeater 131a-2 may be calculated as the loop gain through the path 202a minus the loop gain through the path 202b. Differential loop gain may thus rely on only four random variables, i.e. two gain variables and two loss variables. Compared to simple loop gain, therefore, differential loop gain may exhibit a relatively small maximum/minimum deviation due to normal system fluctuations, and may not be particularly susceptible to distance. These factors may allow setting of a reliable gain variation threshold at which a fault detection trigger may be set.

In the illustrated exemplary embodiment, the differential loop gain associated with the repeater 131a-2 through path 302 may essentially be L2A+G2A+L2B+G1B, whereas the differential loop gain associated with repeater 131a-2 through path 202a may essentially be L2A+G2A+L2B+G2B. It has been found that providing HLLB path consistent with the present disclosure that couples the output of an amplifier on one path to an input of the amplifier on the opposing path, e.g. path 202 or 204, provides increased sensitivity to extra pump loss and extra fiber loss and higher resolvability to inbound and outbound fiber loss compared to an HLLB path such as path 302 that couples the output of an amplifier on one path to the output of an amplifier on the other path.

In particular, extra pump loss may be characterized by complete or partial failure of amplifier pump lasers within a repeater, resulting in a complete or partial reduction in the gain imparted by the associated amplifiers. In general, however, optical amplifiers in a transmission line may be operated in moderate compression and changes in the output signal power of the repeaters tend to self-correct after a few amplifiers by the adjustment of the gain. In one embodiment, for example, a 1 dB drop of pump power in repeater 131a-2 may reduce G2A and G2B by 1 dB, and thus the signal power into amplifier 128a-1 by 1 dB. Since the repeater 131a-1 operates in a gain compression regime, G1B may be increased by about 0.7 dB to provide gain "recovery."

In such an embodiment, the differential loop gain signal through path 302 is effectively L2A+G2A+L2B+G1B. The differential loop gain through path 302 is thus reduced by only 0.3 dB in the presence of the exemplary extra pump loss. In contrast, the differential loop gain through path 202a does not include G1 and is effectively L2A+G2A+L2B+G2B. Consequently, the differential loop gain through path 202a decreases by 2 dB due to 1 dB pump power failure of repeater 131a-2.

This 2 dB reduction in differential loop gain through path 202a resulting from extra pump loss allows greater detection sensitivity than the 0.3 dB reduction in differential loop gain through path 302. For example, the LME may be configured with a higher fault threshold for comparison to the change in differential loop gain through path 202a than through path 302. Use of a higher fault threshold may avoid false alarms associated with normal system fluctuations and measurement errors.

Figure 4:
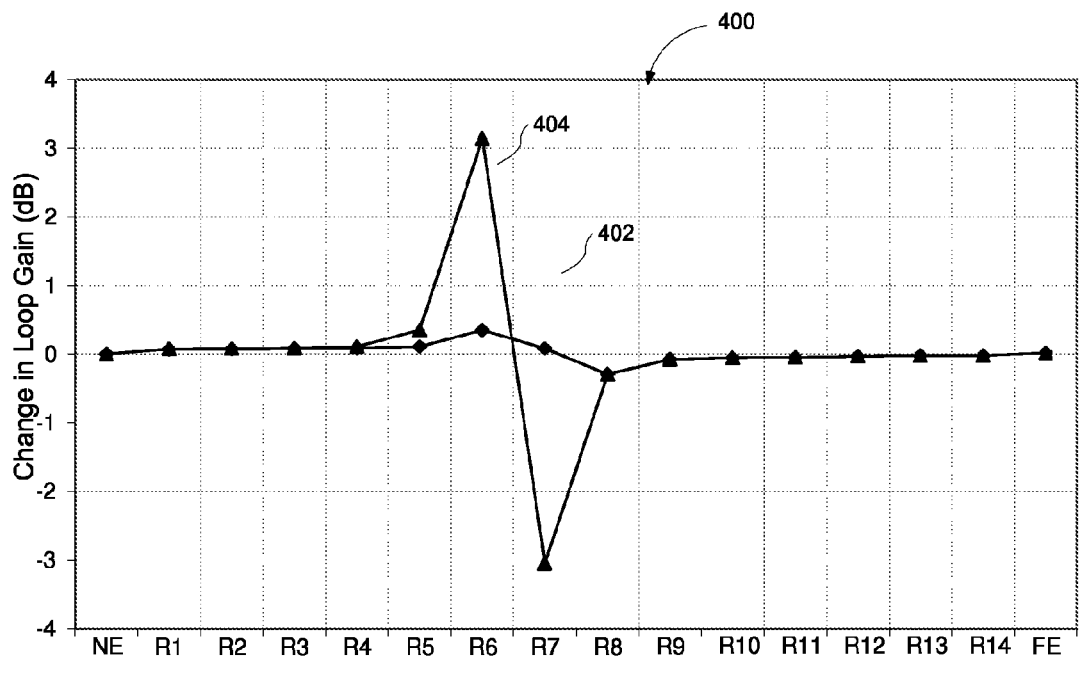
FIG. 4 includes plots of change in loop gain vs. repeater loop back number associated with a 3 dB reduction in repeater pump power in an exemplary system consistent with the present disclosure.

FIG. 4, for example, includes plots 400 of a change in loop gain vs. repeater loop back number associated with an exemplary system including fourteen repeaters with associated loop back paths R1 to R14 and including a 3 dB reduction in repeater pump power, i.e. extra pump loss, at the repeater associated with R7. Plot 402 illustrates the change in loop gain vs. loop back number when the system is configured with loop back paths, e.g. path 302, for coupling an output of a first amplifier amplifying signals in a first direction with an output of a second amplifier amplifying signals in a second direction opposite to the first direction. Plot 404 illustrates the change in loop gain vs. loop back number when the system is configured with loop back paths consistent with the present disclosure, e.g. path 202a, for coupling an output of a first amplifier amplifying signals in a first direction with an input of a second amplifier amplifying signals in a second direction opposite to the first direction. As shown, the 3 dB reduction in repeater pump power results in a much larger change in loop gain when using a loop back path consistent with the present disclosure.

Extra fiber loss may occur and may be characterized by additional or complete loss of transmission through the fiber path, e.g. in paths between repeaters 131a-1 and 131a-2. In general, when extra fiber loss appears in the fiber path, gain control algorithms within system repeaters may cause an adjustment in gain imparted by other repeaters. In one embodiment, for example, if there is a 1 dB extra fiber loss in both directions, e.g. in both L2A and L2B, G2A and G1B may be increased by about 0.7 dB to provide gain "recovery."

In such an embodiment, since the differential loop gain signal through path 302 is effectively L2A+G2A+L2B+G1B, the differential loop gain between repeaters 131a-2 and 131a-1 decreases by only 0.6 dB. In contrast, the differential loop gain through path 202a does not include G1 and is effectively L2A+G2A+L2B+G2B. Consequently, the differential loop gain through path 202a between repeaters 131a-2 and 131a-1 decreases by 1.3 dB due to 1 dB extra fiber loss in L2A and L2B. This 1.3 dB reduction in differential loop gain through path 202a resulting from extra pump loss allows greater detection sensitivity than the 0.6 dB reduction in differential loop gain through path 302.

Figure 5:
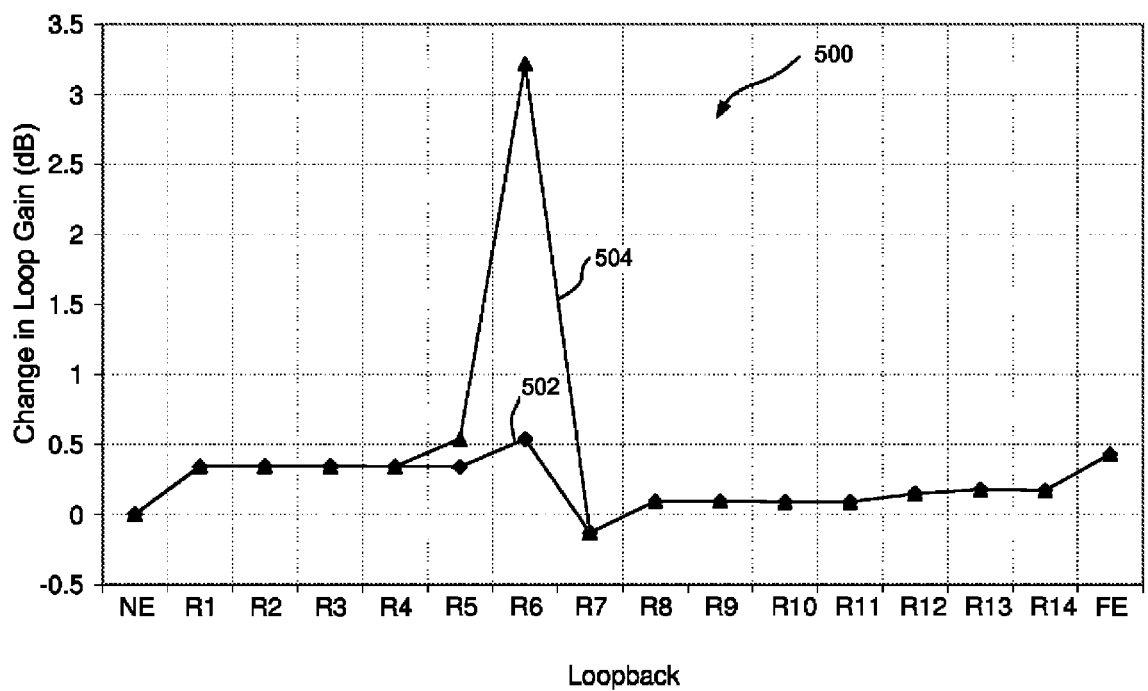
FIG. 5 includes plots of a change in loop gain vs. repeater loop back number associated with a 3 dB extra fiber loss in both directions of an exemplary system consistent with the present disclosure.

FIG. 5, for example, includes plots 500 of a change in loop gain vs. repeater loop back number associated with an exemplary system including fourteen repeaters with associated loop back paths R1 to R14 and including a 3 dB increase in fiber loss, i.e. extra fiber loss, in both directions between the repeaters associated with R6 and R7. Plot 502 illustrates the change in loop gain vs. loop back number when the system is configured with loop back paths, e.g. path 302, for coupling an output of a first amplifier amplifying signals in a first direction with an output of a second amplifier amplifying signals in a second direction opposite to the first direction. Plot 504 illustrates the change in loop gain vs. loop back number when the system is configured with loop back paths consistent with the present disclosure, e.g. path 202a, for coupling an output of a first amplifier amplifying signals in a first direction with an input of a second amplifier amplifying signals in a second direction opposite to the first direction. As shown, the 3 dB extra fiber loss results in a much larger change in loop gain when using a loop back path consistent with the present disclosure.

Also, the differential loop gain between repeaters 131a-1 and 131a-2 through paths 302 and 304, i.e. G2A+G1B+L2A+L2B, is independent on the location of LME on either side of the system, e.g. LME 140, 142. This symmetric architecture associated the path 302 does not allow the LME to resolve the location of extra fiber loss in either direction if the extra loss occurred at only one direction.

However, differential loop gain between repeaters 131a-1 and 131a-2 through a loop back path from path 110 to path 120 consistent with the present disclosure, e.g. path 202a, is effectively equal to G2A+G2B+L2A+L2B. L2A is the loss of the fiber span in front of repeater 131a-2 while L2B is the loss of the fiber span after the repeater 131a-2. Relative to LME 140, this configuration makes the LME signal more sensitive to extra fiber loss occurring at the in-bound direction (i.e., L2B) than the out-bound direction (i.e., L2A). In the opposite direction, differential loop gain between repeaters 131a-1 and 131a-2 through a loop back path from path 120 to path 110 consistent with the present disclosure, e.g. path 204b, is effectively equal to, G1A+G1B+L2A+L2B. L2A is the loss of the fiber span after the repeater 131a-1 and L2B is the loss of the fiber span before the repeater 131a-1. Relative to LME 142, this configuration makes the LME signal more sensitive to the extra fiber loss occurring at the in-bound direction (i.e. L2A) than the out-bound direction (i.e., L2B). This non-symmetric response to the extra fiber loss in either direction, allows resolution of the location of the extra fiber loss to either path 110 or 120. For example, if a change in differential loop gain is higher at LME 140 than at LME 142, the extra fiber loss may be considered as occurring in L2B.

There is thus provided a system and method using loop gain for fault identification in optical transmission line monitoring equipment. According to one aspect of the disclosure, there is provided an optical communication system including line monitoring equipment configured to provide a test signal; a first optical fiber path configured to receive the test signal and carry the test signal in a first direction; a second optical fiber path configured to carry signals in a second direction opposite from the first direction; and at least one repeater coupled to the first and second optical fiber paths. The repeater includes: a first optical amplifier configured to amplify optical signals on the first optical fiber path; a second optical amplifier configured to amplify optical signals on the second optical fiber path; and a loop back path coupling an output of the first optical amplifier to an input of the second optical amplifier. The loop back path is configured to couple at least a portion of the test signal to the second optical fiber path as a returned test signal. The line monitoring equipment is configured to identify a fault in the optical communication system in response to the returned test signal.

According to another aspect of the disclosure, there is provided an optical repeater including a first optical amplifier configured to amplify first optical signals on a first optical fiber path for carrying the first optical signals in a first direction; a second optical amplifier configured to amplify second optical signals on second optical fiber path for carrying the second optical signals in a second direction opposite from the first direction; and a loop back path coupling at least a portion of a test signal carried on the first optical path from an output of the first optical amplifier to an input of the second optical amplifier.

According to yet another aspect of the disclosure, there is provided a method of monitoring an optical communication system including a first optical fiber path for carrying signals in a first direction and a second optical fiber path for carrying signals in a second direction opposite to the first direction, the method including: transmitting a test signal on the first optical fiber path; coupling at least a portion of the test signal from the first optical fiber path to the second optical fiber path through a loop back path as a returned test signal, the loop back path coupling an output of a first optical amplifier disposed in a repeater and configured to amplify signals on the first optical fiber path to an input of a second amplifier disposed in the repeater and configured to amplify signals on the second optical fiber path; receiving the returned test signal from the second optical fiber path; and identifying a fault in the optical communication system in response to the returned test signal.

The embodiments that have been described herein but some of the several which utilize this invention and are set forth here by way of illustration but not of limitation. Many other embodiments, which will be readily apparent to those of ordinary skill in the art, may be made without departing materially from the spirit and scope of the invention

What is claimed is:

1. An optical communication system comprising:
   line monitoring equipment configured to provide a test signal;
   a first optical fiber path configured to receive said test signal and carry said test signal in a first direction;
   a second optical fiber path configured to carry signals in a second direction opposite from said first direction; and
   a plurality of repeaters coupled to said first and second optical fiber paths, each of said repeaters comprising,
      a first optical amplifier configured to amplify optical signals on said first optical fiber path,
      a second optical amplifier configured to amplify optical signals on said second optical fiber path, and
      a loop back path coupling an output of said first optical amplifier to an input of said second optical amplifier, said loop back path being configured to couple at least a portion of said test signal to said second optical fiber path as a returned test signal,
   said line monitoring equipment being configured to calculate differential loop gain data associated with each of said loop back paths from said returned test signals of said plurality of repeaters and provide an output identifying a fault in the optical communication system in response to said differential loop gain data, said differential loop gain data comprising, for each one of said loop back paths,
      a loop gain imparted to said test signal through said each one of said loop back paths, minus
      a previous loop back path loop gain imparted to said test signal through one of said loop back paths preceding said each one of said loop back paths.

2. An optical communication system according to claim 1, said system further comprising second line monitoring equipment configured to provide a second test signal on said second optical path, and wherein each of said plurality of repeaters comprises a second loop back path coupling an output of said second optical amplifier to an input of said first optical amplifier, said second loop back path being configured to couple at least a portion of said second test signal to said first optical fiber path as a returned second test signal.

3. An optical communication system according to claim 1, each of said plurality of repeaters further comprises a housing, said first and second optical amplifiers and said loop back path being disposed within said housing.

4. An optical communication system according to claim 1, wherein each of said plurality of repeaters comprises an optical coupler configured to couple a fraction the total optical power of said first optical signals from said output of said first optical amplifier to said loop back path.

5. An optical communication system according to claim 4, wherein said loop back path comprises an optical attenuator for attenuating said fraction of said first optical signals.

6. An optical communication system according to claim 5, wherein said loop back path comprises a wavelength selective optical filter coupled to an output of said optical attenuator for reflecting one or more wavelengths back through said attenuator.

7. An optical communication system according to claim 6, each of said plurality of repeaters further comprises a second coupler for coupling a fraction of the total optical power of said wavelengths reflected through said attenuator to said input of said second optical amplifier.

8. A method of monitoring an optical communication system comprising a plurality of loop back paths coupling a first optical fiber path for carrying signals in a first direction and a second optical fiber path for carrying signals in a second direction opposite to the first direction, said method comprising:
   transmitting a test signal on the first optical fiber path;
   coupling at least a portion of said test signal from said first optical fiber path to said second optical fiber path through each said loop back path as an associated returned test signal, each said loop back path coupling an output of a first optical amplifier disposed in an associated repeater and configured to amplify signals on said first optical fiber path to an input of a second amplifier disposed in said associated repeater and configured to amplify signals on said second optical fiber path;

receiving said returned test signals from each of said loop back paths from the second optical fiber path;

calculating differential loop gain data associated with each of said loop back paths from the returned test signals; and identifying a fault in the optical communication system in response to said differential loop gain data, said differential loop gain data comprising, for each one of said loop back paths, a loop gain imparted to said test signal through said each one of said loop back paths, minus a previous loop back path loop gain imparted to said test signal through one of said loop back paths preceding said each one of said loop back paths, wherein each of said plurality of repeaters comprises a second loop back path, and wherein said method further comprises:

transmitting a second test signal on the second optical fiber path;

coupling at least a portion of said second test signal from said second optical fiber path to said first optical fiber path through each said second loop back path as an associated second returned test signal, each said second loop back path coupling an output of said second optical amplifier to an input of said first optical amplifier;

receiving said second returned test signals from each of said second loop back paths from the first optical fiber path;

calculating second differential loop gain data associated with each of said second loop back paths from said second returned test signals; and identifying whether said fault is in said first or second optical fiber path in response to said differential loop gain data and said second differential loop gain data.

9. A method according to claim 8, wherein said fault is an extra fiber loss fault in said optical communication system.

10. A method according to claim 8, wherein said fault is an extra pump loss fault in said optical communication system.

11. An optical communication system according to claim 2, wherein said second line monitoring equipment is configured to calculate second differential loop gain data associated with each of said second loop back paths from said returned second test signals and provide an output identifying whether said fault is in said first or second optical fiber path in response to said differential loop gain data and said second differential loop gain data.

12. A method according to claim 11, wherein said fault is an extra fiber loss fault in said optical communication system.

\* \* \* \* \*